United States Patent
Iryo et al.

(10) Patent No.: US 9,506,799 B2
(45) Date of Patent: Nov. 29, 2016

(54) LIQUID LEVEL DETECTION DEVICE AND METHOD OF MANUFACTURING THE SAME

(71) Applicant: Nippon Seiki Co., Ltd., Niigata (JP)

(72) Inventors: Hiroyuki Iryo, Niigata (JP); Yoshiyuki Shimazaki, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 63 days.

(21) Appl. No.: 14/430,197

(22) PCT Filed: Sep. 6, 2013

(86) PCT No.: PCT/JP2013/074057
§ 371 (c)(1),
(2) Date: Mar. 20, 2015

(87) PCT Pub. No.: WO2014/050499
PCT Pub. Date: Apr. 3, 2014

(65) Prior Publication Data
US 2015/0247752 A1  Sep. 3, 2015

(30) Foreign Application Priority Data

Sep. 28, 2012 (JP) ................................. 2012-218598

(51) Int. Cl.
*G01F 23/38* (2006.01)
*G01F 23/46* (2006.01)
(52) U.S. Cl.
CPC ............... *G01F 23/38* (2013.01); *G01F 23/46* (2013.01)
(58) Field of Classification Search
CPC ........................................ B29C 45/00–45/844
See application file for complete search history.

(56) References Cited

U.S. PATENT DOCUMENTS

| | | | |
|---|---|---|---|
| 6,711,950 B1 * | 3/2004 | Yamaura | ............... G01F 23/363 73/290 R |
| 7,204,685 B1 * | 4/2007 | Crain | .................. B29C 45/2673 425/185 |

(Continued)

FOREIGN PATENT DOCUMENTS

| JP | 2003-089154 A | 3/2003 |
|---|---|---|
| JP | 2003-172653 A | 6/2003 |

(Continued)

OTHER PUBLICATIONS

International Search Report issued in counterpart International Patent Application No. PCT/JP2012/074057 on Dec. 10, 2013; 4 pages with English translation.

*Primary Examiner* — Peter Macchiarolo
*Assistant Examiner* — Nathaniel Kolb
(74) *Attorney, Agent, or Firm* — McDermott Will & Emery LLP

(57) ABSTRACT

Provided is a liquid level detection device with excellent bonding strength between components. This liquid level detection device is provided with a holder which has a magnet inside and which rotates in response to displacement of a float floating in the liquid the level of which is to be measured, a main body unit which rotatably supports the holder and has a magnetic detection element which detects magnetic pole change accompanying rotational movement of the magnet, and a cover which covers the holder and which is attached by welding to the main body unit to prevent the holder from falling away from the main body unit. The cover is welded to the main body unit by melting protrusions formed on the main body unit.

4 Claims, 9 Drawing Sheets

(56) References Cited

U.S. PATENT DOCUMENTS

| | | | | |
|---|---|---|---|---|
| 7,536,989 B2* | 5/2009 | Tomoyuki | ............... | B60K 15/03 123/198 E |
| 2004/0163467 A1* | 8/2004 | Tanaka | ............... | G01F 23/38 73/313 |
| 2007/0035373 A1* | 2/2007 | Henry | ............... | B29C 45/14311 336/198 |
| 2007/0090832 A1* | 4/2007 | Yasuda | ............... | G01F 23/38 324/207.25 |
| 2011/0016970 A1* | 1/2011 | Sakamaki | ............... | G01F 23/363 73/317 |
| 2012/0266670 A1* | 10/2012 | Ichisawa | ............... | G01F 23/38 73/314 |
| 2015/0044960 A1* | 2/2015 | Hara | ............... | B29C 45/14467 454/254 |

FOREIGN PATENT DOCUMENTS

| | | |
|---|---|---|
| JP | 2004-152546 A | 5/2004 |
| JP | 2004-251780 A | 9/2004 |
| JP | 2007-183241 A | 7/2007 |
| JP | 2010-236495 A | 10/2010 |
| JP | 2011-203022 A | 10/2011 |

* cited by examiner (a)

(b)

(c)

(a)

(b)

(a)

(b)

LIQUID LEVEL DETECTION DEVICE AND METHOD OF MANUFACTURING THE SAME

RELATED APPLICATIONS

This application is the U.S. National Phase under 35 U.S.C. §371 of International Application No. PCT/JP2013/074057, filed on Sep. 6, 2013, which in turn claims the benefit of Japanese Application No. 2012-218598, filed on Sep. 28, 2012, the disclosures of which Applications are incorporated by reference herein.

TECHNICAL FIELD

Embodiments of the present invention relate to a liquid level detection device capable of improving a bonding strength between components, and a method of manufacturing the liquid level detection device.

BACKGROUND ART

Various types have been developed as a liquid level detection device, which is provided in a fuel tank for storing liquid fuel such as gasoline, and measures a liquid level of liquid fuel. For example, Patent Literature 1 discloses a liquid level detection device, which comprises a float that is vertically moved accompanying a liquid level fluctuation, a float arm that converts the vertical movement of the float into a rotational movement, a detection unit that outputs a detection signal indicating a liquid level in accordance with the rotational movement of the float arm, and a first case and a second case that contain the detection unit in a closed state.

Patent Literature 2 discloses a method of manufacturing a liquid level detection device, which manufactures a fuel level gauge for detecting a liquid level height, comprising a housing fixed to a fuel tank, and a circuit unit that is comprised of a magnetoelectric conversion element, a capacitor, and a terminal, and is embedded inside the housing. In a first molding process, a cover unit that covers the terminal with a molding material of the housing is formed. The cover unit has a positioning groove with one end in the longitudinal direction closed and the other end opened. In a connection process, a foot portion of the capacitor is inserted into the positioning groove, thereby positioning the capacitor, and the foot portion is welded to a capacitor connection part. In a second molding process, the capacitor is covered, providing an appearance of the housing.

CITATION LIST

Patent Literature

Patent Literature 1: JP-A-2003-172653
Patent Literature 2: JP-A-2011-203022

SUMMARY OF THE INVENTION

Technical Problem

However, in the liquid level detection device disclosed in the Patent Literature 1, the welding structure of first and second cases adopts a structure that fixes a contact surface comprising the flat surfaces of the first and second cases by melting by a laser. Such welding is difficult to grasp the state of welding, and may be insufficient in the strength of welding.

In the liquid level detection device manufactured by the method of manufacturing a liquid level detection device disclosed in the Patent Literature 2, the housing is composed of a first molded product comprising the circuit unit, and a second molded product covering the area around the first molded part. When inserting the first molded product into the second molded product, since the positioning part formed in the first molded product is not covered by the second molded product, there is a problem that a fuel soaks through a gap between the first and second molded products, and corrodes the internal circuit. When setting the second molded product in a mold, a fitting failure occurs, and a concave portion that is a positioning part is not set on a pin. This causes a problem that the production equipment is stopped, and the production efficiency is lowered.

The present invention has been made in order to solve the above problems. Accordingly, it is an object of the invention to provide a liquid level detection device capable of improving a bonding strength between components, and a method of manufacturing the liquid level detection device.

Solution to Problem

In order to achieve the above object, a liquid level detection device according to a first aspect of the invention comprises a holder that has a magnet inside, and rotates in accordance with displacement of a float floating on liquid that is a measuring object of liquid level; a main body unit that rotatably supports the holder, and has a magnetic detection element for detecting a change in a magnetic pole accompanying rotation of the magnet; and a cover that covers the holder, and prevents the holder from falling out from the main body unit by welded to the main body unit, wherein the cover is welded to the main body unit by melting a protrusion formed in the main body unit or the cover.

The protrusion may be tapered, and may have a trapezoidal cross section.

In order to achieve the above object, a liquid level detection device according to a second aspect of the invention comprises a holder that has a magnet inside, and rotates in accordance with displacement of a float floating on liquid that is a measuring object of liquid level; and a main body unit that comprises a magnetic detection element for detecting a change in a magnetic pole accompanying rotation of the magnet, a capacitor, and a terminal that is electrically connected to the magnetic detection element and the capacitor, wherein the main body unit comprises a primary molded body that is formed by insertion molding the terminal, and a secondary molded body that is formed by insertion molding the primary molded body provided with the capacitor and the magnetic detection element, the primary molded body comprises a positioning means for positioning the primary molded body at a predetermined position when molding the secondary molded body, and a first protrusion ring that is a circular protrusion surrounding the positioning means, and an apex of the first protrusion ring is welded to a part that is molded when molding the second molded body.

The positioning means may be a pin hole into which a positioning pin is inserted, and an inside slope of the first protrusion ring may be directly connected to the peripheral edge of the pin hole.

The primary molded body may have a second protrusion ring surrounding the first protrusion ring.

The first protrusion ring may have a triangular cross section.

In order to achieve the above object, a method of manufacturing a liquid level detection device according to a third aspect of the invention is a method of manufacturing a liquid level detection device comprising a holder that has a magnet inside, and rotates in accordance with displacement of a float floating on liquid that is a measuring object of liquid level; and a main body unit comprising a magnetic detection element for detecting a change in a magnetic pole accompanying rotation of the magnet, a capacitor, and a terminal that is electrically connected to the magnetic detection element and the capacitor, the method is characterized by comprising a step of molding a primary molded body by insertion molding the terminal, and a step of molding the main body unit by insertion molding the primary molded body provided with the capacitor and the magnetic detection element, wherein the primary molded body comprises a positioning means for position the primary molded body at a predetermined position when molding the main body unit, and a protrusion ring that is a circular protrusion surrounding the positioning means.

Effects of the Invention

According to the embodiments of the present invention, it is possible to provide a liquid level detection device capable of improving a bonding strength between components, and a method of manufacturing the liquid level detection device.

BRIEF DESCRIPTION OF THE DRAWINGS

FIG. 5 (c) is a rear view of a primary molded product taken along the arrow Vc-Vc in FIG. 5 (a).

FIG. 6 (a) is a magnified view of the part "VIa" in FIG. 4 (c). FIG. 6 (b) is a magnified view of the part "VIb" in FIG. 5 (a). FIG. 6 (c) is a sectional view taken along the arrow VIc-VIc in FIG. 6 (c).

FIG. 7 (a) is a magnified view of the part "VIIa" in FIG. 5 (c). FIG. 7 (b) is a sectional view of the positioning part taken along the arrow VIIb-VIIb in FIG. 7 (a).

FIG. 9 (b) is a view showing a holder, and is a plan view of the holder indicated by the arrow IXb-IXb in FIG. 1.

MEANS FOR SOLVING THE PROBLEM

Hereinafter, a liquid level detection device 1 according to an embodiment of the present invention will be explained with reference to the accompanying drawings.

Figure 1:
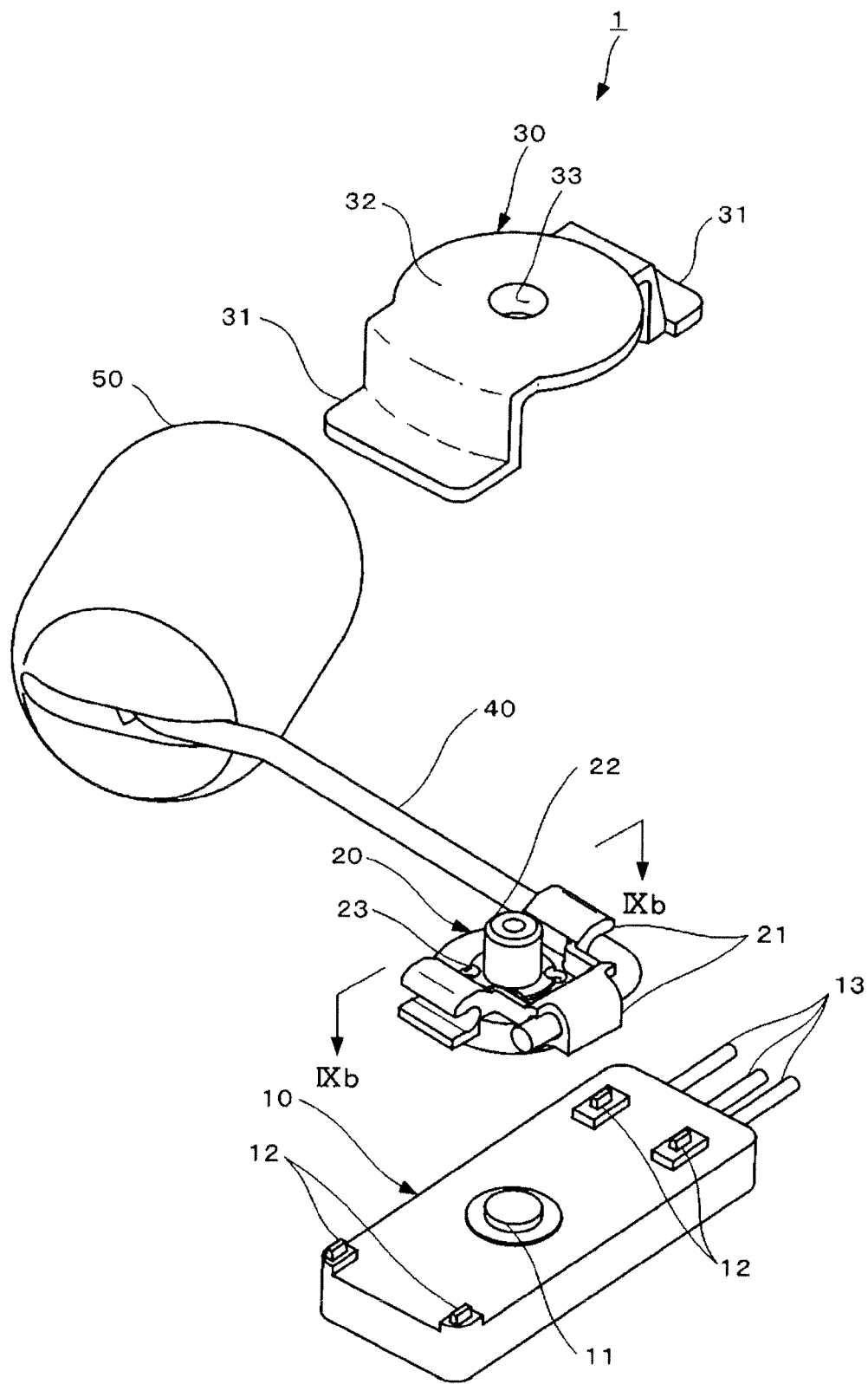
FIG. 1 is an exploded perspective view of a liquid level detection device according to an embodiment of the invention.
Figure 2:
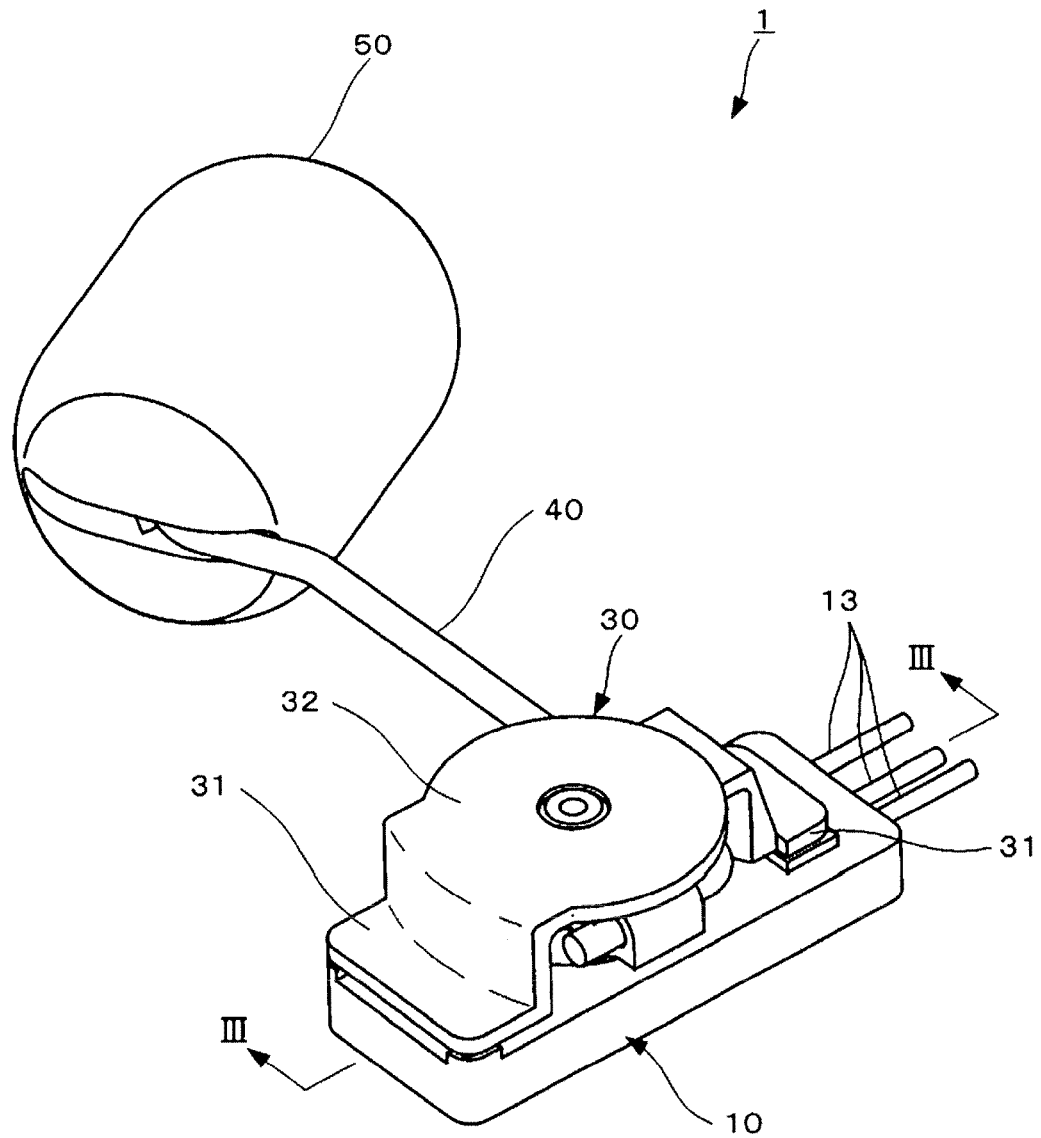
FIG. 2 is a perspective view of a liquid level detection device according to an embodiment of the invention.
Figure 3:
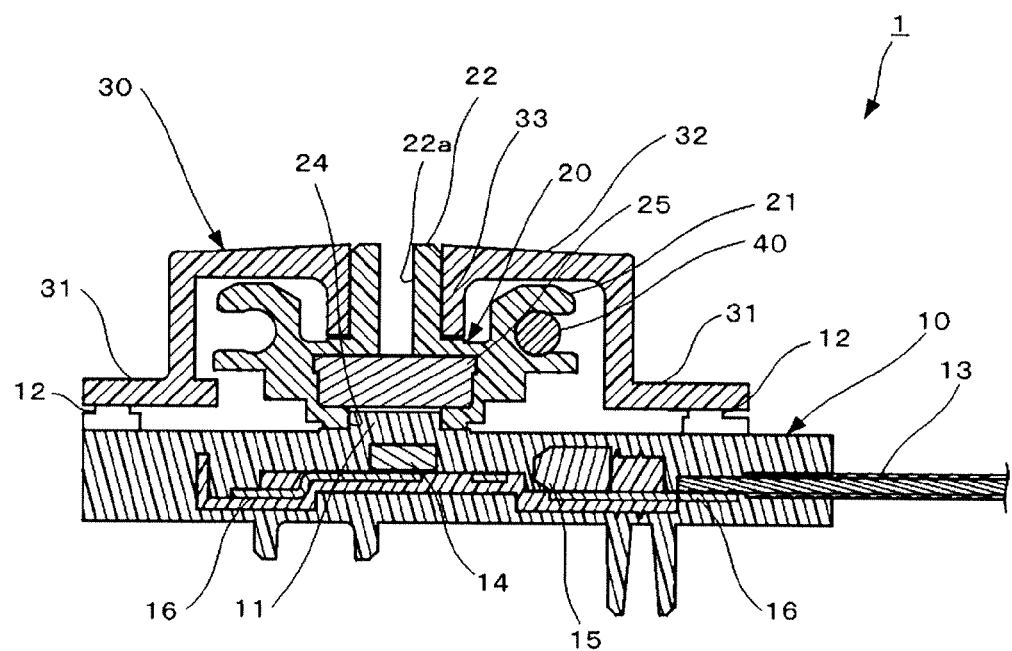
FIG. 3 is a sectional view of a liquid level detection device taken along the arrow III-III in FIG. 2.

FIG. 1 is an exploded perspective view of a liquid level detection device according to an embodiment of the invention. FIG. 2 is a perspective view of a liquid level detection device according to an embodiment of the invention. FIG. 3 is a sectional view of a liquid level detection device taken along the arrow III-III in FIG. 2.

As shown in FIG. 1 and FIG. 2, a liquid level detection device 1 according to an embodiment of the invention comprises a main body unit 10, a holder 20 that is rotatably attached to the main body unit 10, and a cover 30 that is welded to the main body unit 10 to prevent the holder 20 from falling out of the main body unit 10. The holder 20 is provided with a float arm 40 with a float 50 attached to the distal end thereof. The liquid level detection device 1 is disposed in a not-shown fuel tank for storing liquid fuel such as gasoline.

The float 50 is made of synthetic resin, for example, and is configured to receive buoyancy from liquid as an object of measuring a liquid level, and is floated in the liquid. The float 50 is formed substantially in a bale shape so as to stably float in the liquid.

The float arm 40 is made of a metallic wire, for example, and is interposed between the float 50 and the holder 20 thereby connecting them. The float arm 40 transmits a vertical movement of the float 50 caused liquid level fluctuations to the holder 20. The holder 20 rotates on the main body unit 10 by the force transmitted from the float arm 40.

The main body unit 10 is made of resin material such as Polyacetal. In substantially a central portion of the top of the main body unit 10 in the drawing, a cylindrical rotary support part 11 is protruded. The rotary support part 11 supports the holder 20 rotatably in a circumferential direction, when it is fit with a rotation hole 24 formed in the holder 20 described later. On the top of the main body unit 10, four welding protrusions 12 are formed so as to surround the rotary support part 11. By melting the welding protrusions 12 by laser or the like, the cover 30 is welded to the main body unit 10. The welding protrusions 12 shown in FIG. 1 are in the state before the cover 30 is welded, that is, before the welding protrusions 12 are melted.

As shown in FIG. 3, the main body unit 10 includes a plurality of terminals 16, and includes a magnetic detection element 14 and a capacitor 15 for absorbing noises, which are electrically connected to the terminal 16. The magnetic detection element 14 is made of a hall IC, for example, and is electrically connected to the terminal 16 by laser welding or resistance welding. A wiring cord 13 extends from the main body unit 10. The wiring cord 13 is electrically connected to the terminal 16 to supply power and output a signal.

The holder 20, like the main body unit 10, is made of resigning material such as Polyacetal. The holder 20 is provided with an arm holding part 21 for holding the float arm 40 having a float 50 attached at the distal end thereof.

As shown in FIG. 3, a circular rotation hole 24 is formed on the bottom of the holder 20 in the drawing. When the rotation hole 24 fits with the rotary support part 11 formed in the main body unit 10, the holder 20 can freely rotate along the circumferential direction of the rotation hole 24. The holder 20 is made of the same resin material such as Polyacetal with the same main body unit 10, and it is possible to ensure sufficient rotation of the holder. On the top of the holder 20, a rotary shaft 22 that is a cylindrical protrusion is formed. The central axes of the rotation hole 24 and rotary shaft 22 are aligned on the same axis.

The holder 20 has a cylindrical magnet 25 inside. The magnet 25 is previously set in a mold before the holder 20 is molded. Thereafter, the magnet 25 is fixed in the holder by injecting a resin for the holder 20 into the mold. The magnet 25 is made of neodymium ferrite, for example, and is magnetized in two poles in the embodiment. When the holder 20 is attached to the main body unit 10, the magnet in the holder 20 is arranged to face to the magnetic detection element 14 provided in the main body unit 10. Thus, the magnetic detection element 14 can detect changes in the magnetic pole of the magnet 25 accompanying the rotation of the holder 20.

A middle hole 22a of the rotary shaft 22 provided on the top of the holder 20, and a rotation hole 24 provided on the bottom of the holder 20 are each communicating to the magnet 25. Thus, it is possible to view the magnet 25 fixed in the holder 20 from outside through the middle hole 22a and the rotation hole 24. As the holder 20 is provided with the middle hole 22a and the rotation hole 24 communicating to the magnet 25, it is possible to discharge the gas generated inside during molding the main body unit 10 to the outside. Thus, it is possible to ensure sufficient contact between the magnet 25 and the holder 20.

The cover 30 is made of resigning material such as Polyacetal, like the main body unit 10 and the holder 20. As shown in FIG. 1, the cover 30 has a welding part 31 to be welded to the welding protrusion 12 formed in the main body unit 10, and a top board 32 to cover the holder 20 from above.

As shown in FIG. 1 and FIG. 3, in substantially the center of the top board 32, a cylindrical bearing unit 33 is formed downward in the drawing. The inside diameter of the bearing unit 33 is a little larger than the outside diameter of the rotary shaft 22. The rotary shaft 22 formed in the holder 20 is inserted into the bearing unit 33. Thus, the bearing unit 33 can rotatably support the rotary shaft 22. Further, as the cover 30 is fixed to the main body unit 10 through the welding part 31 and the welding protrusion 12, as shown in FIG. 3, it is possible to prevent the holder 20 from lifting at the lower end of the bearing unit 33. As described above, the cover 30 rotatably supports the holder 20, and prevents the lifting of the holder 20, thereby preventing the falling of the holder 20 from the main body unit 10.

Figure 4:
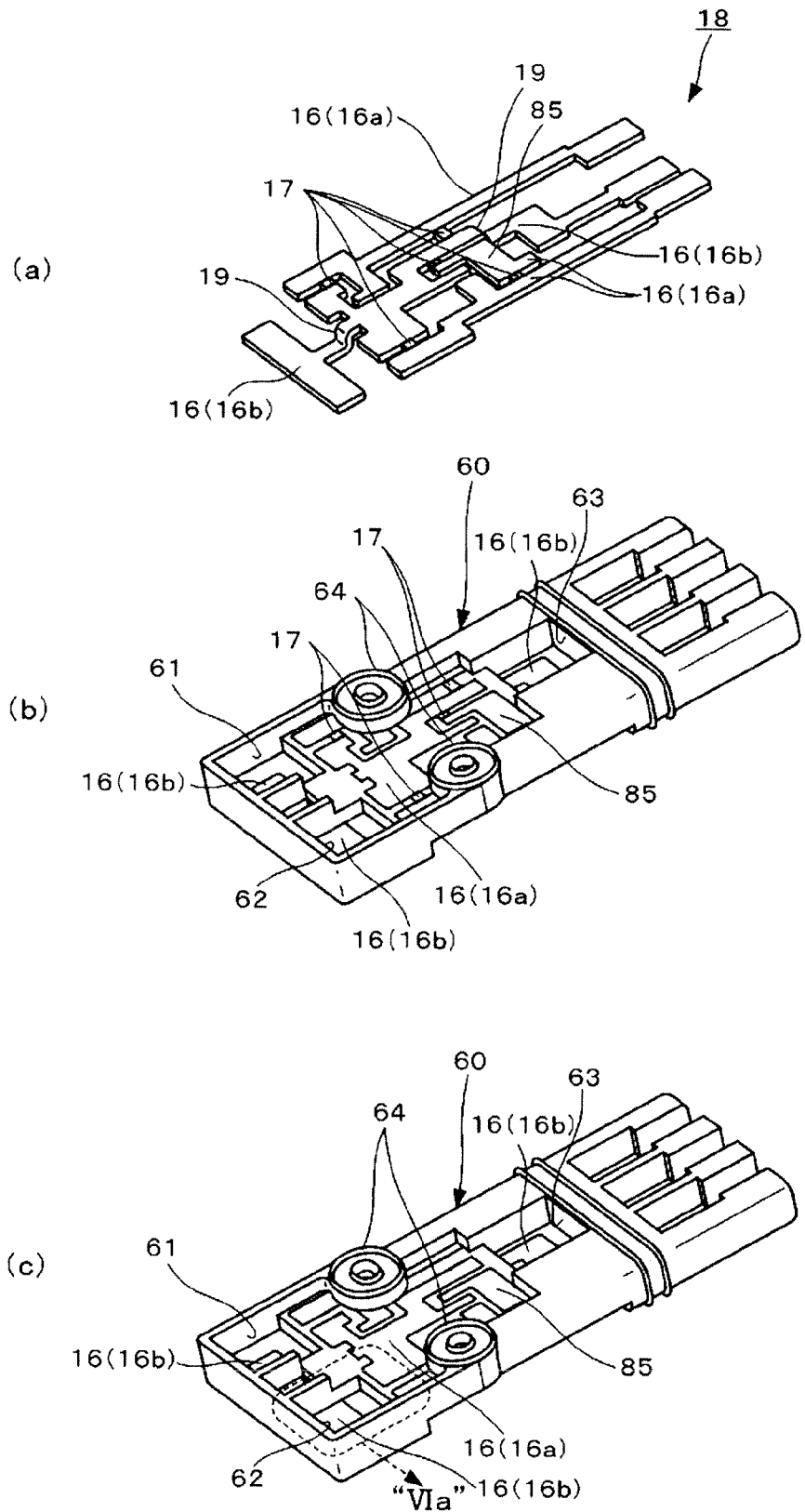
FIGS. 4 (a) to (c) are perspective views showing steps of a manufacturing process of a main body unit constituting a liquid level detection device according to an embodiment of the invention.
Figure 5:
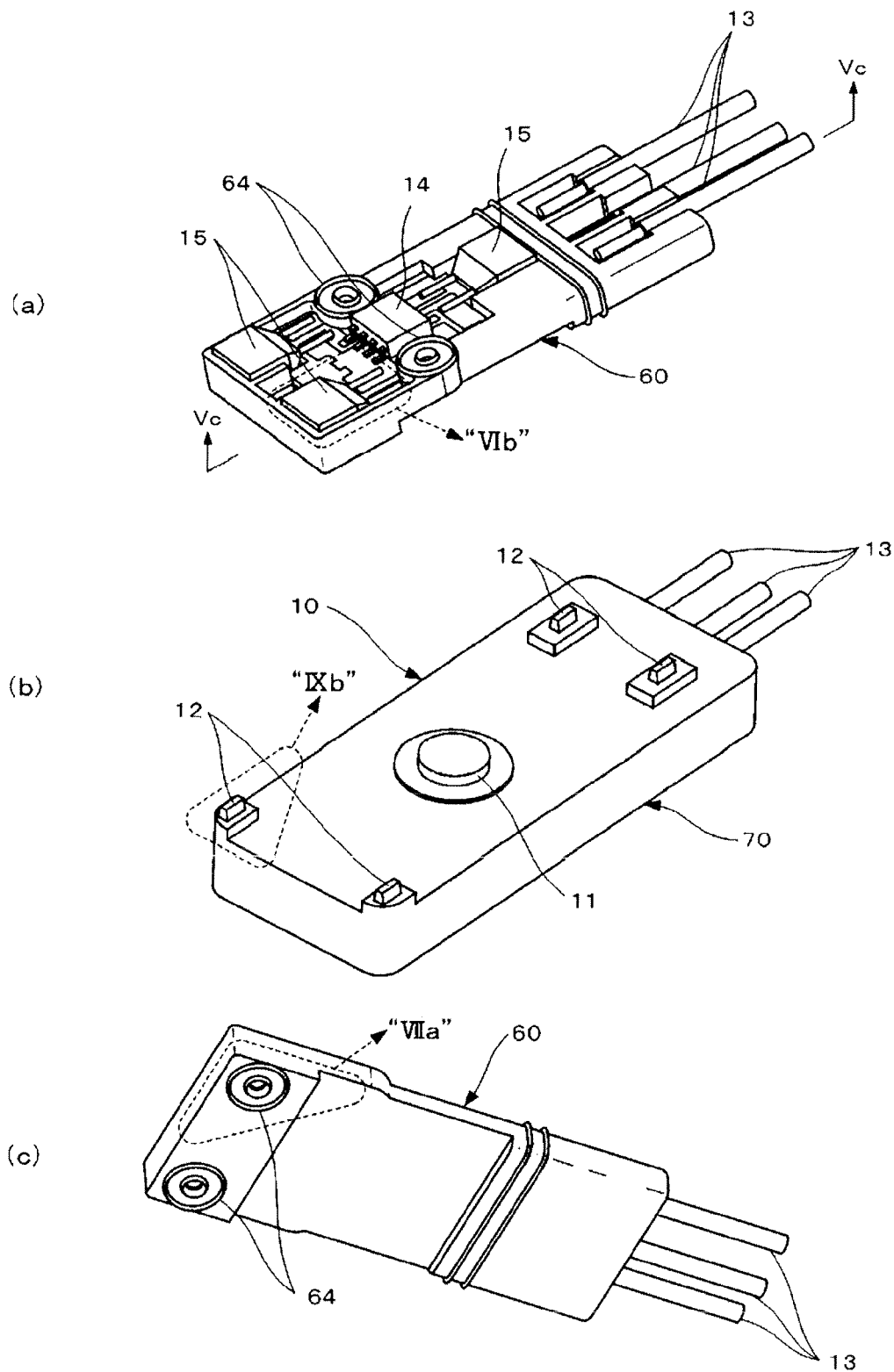
FIGS. 5 (a) to (c) are perspective views showing steps of a manufacturing process of a main body unit constituting a liquid level detection device according to an embodiment of the invention.
Figure 6:
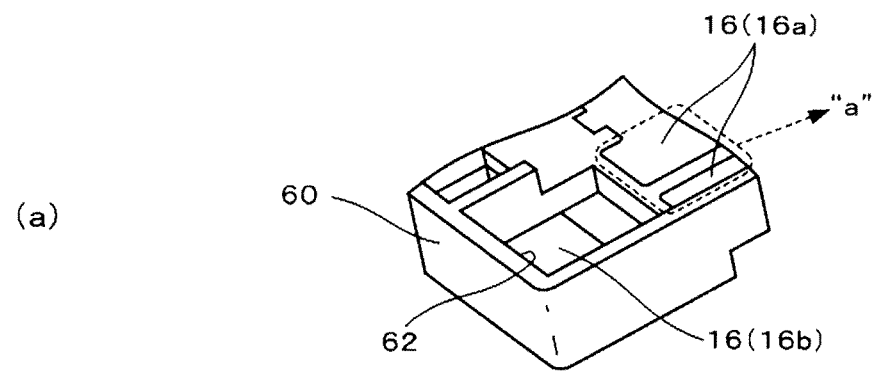
FIG. 6 shows the details of a main body unit constituting a liquid level detection device according to an embodiment of the invention.
Figure 6:
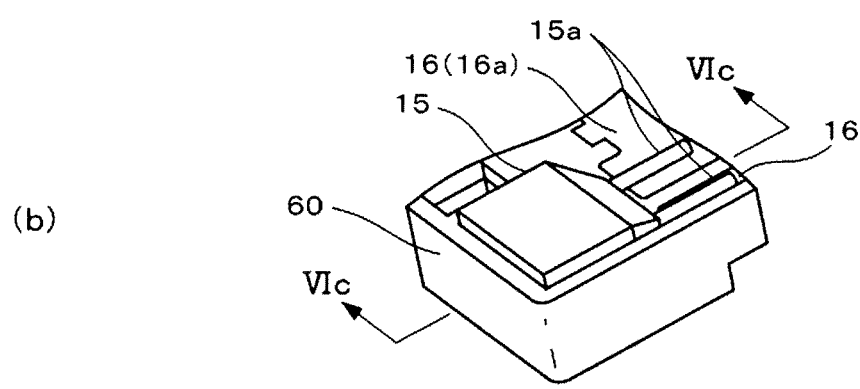
Figure 6:
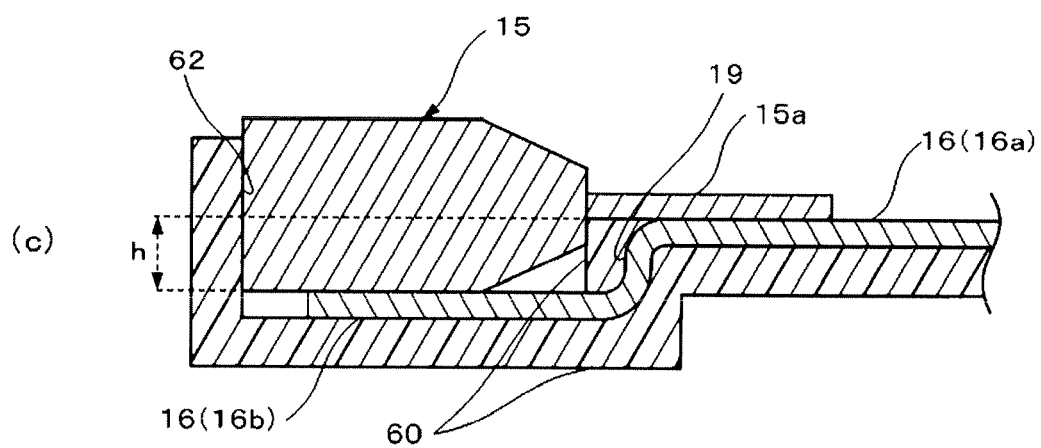

Next, a structure of the liquid level detection device 1 will be described in detail while describing a manufacturing process of the main body unit 10 that is a component of the liquid level detection device 1 according to the embodiment. FIGS. 4 (a) to (c) and FIGS. 5 (a) and (b) illustrates a manufacturing process of the main body unit 10 that constitutes the liquid level detection device 1 according to the embodiment. FIG. 5 (c) is a rear view of a primary molded body 60 taken along the arrow Vc-Vc in FIG. 5 (a). FIG. 6 is a view showing the details of the main body unit 10. FIG. 6 (a) is a magnified view of the part VIa in FIG. 4 (c). FIG. 6 (b) is a magnified view of the part VIb in FIG. 5 (a). FIG. 6 (c) is a sectional view of the main body unit 10 taken along the arrow VIc-VIc in FIG. 6 (b).

FIG. 4 (a) shows a plurality of terminals 16 to be mounted on the main body unit 10. The terminal 16 is integrated with a connecting piece 17, thereby forming a terminal group 18. The terminal group 18 is provided with two bent portions 19 that are bent to make a step in the terminal 16. In the embodiment, the terminal 16 is comprised of a first flat portion 16a, and a second portion 16b that is stepped down from the first portion 16a by the bent portion 19.

The main body unit 10 of the liquid level detection device 1 according to the embodiment is manufactured through two times of resin molding process. FIG. 4 (b) shows a primary molded body 60 that is formed by insertion molding (first time resin molding) the terminal group 18. Thus, the terminal group 18 is fixed to the primary molded body 60. Then, press the primary molded body 60, and eliminate the connecting piece 17 that connect the terminal 16 (FIG. 4 (c)).

A structure of the primary molded body 60 manufactured as above will be described in detail. As shown in FIG. 4 (c), the primary molded body 60 is provided with first to third cavities 61, 62, and 63. The first to third cavities 61, 62, and 63 have the similar configuration. Thus, the description will be made by taking the second cavity 62 as an example.

As shown in FIG. 6 (a), the second cavity 62 is defined by the resin of the primary molded body 60, but the terminal 16 (the second portion 16b) is exposed on the bottom. The terminal 16 (the first portion 16a) is also exposed in the area "a" one step raised from the second cavity 62. Like this, the primary molded body 60 includes the terminals 16 (the first portion 16a and second portion 16b) with different heights. This is caused by the terminal group 18 formed two bent portions 19 that are bent to make a step in the terminal 16, as described with reference to FIG. 4 (a).

Then, a magnetic detection element 14, a capacitor 15, and a wiring cord 13 are arranged on the primary molded body 60, and electrically connected to the terminal 16 by laser welding or resistance welding. As shown in FIG. 5 (a), the capacitor 15 is disposed in the first to third cavities 61, 62, and 63. When disposing the capacitor 15, it is desirable to temporarily fix the capacitor 15 to the primary molded body 60 with an adhesive, for example, not to cause a shift in the position of the capacitor 15 in later resin molding. Generally, it is difficult to bond the capacitor 15 and the resin of the primary molded body 60 with an adhesive. On the other hand, it is possible to bond the capacitor 15 and the terminal 16 (the second portion 16b) with an adhesive. Thus, in the embodiment, the temporary fixing of the capacitor 15 with an adhesive is facilitated by exposing the terminal 16 (the second portion 16b) on the bottom of the second cavity 62. The shape of the second cavity 62 is almost the same as the shape of the disposed capacitor 15. Therefore, it is possible to prevent a shift in the position of the capacitor 15 in later molding, and easily execute positioning of the capacitor 15. This enables accurate positioning of the capacitor 15.

Further, the embodiment uses the capacitor 15 with two lead wires 15a extend from a main body. As shown in FIG. 6 (c), the capacitor 15 has a distance h between the bottom and the position where the lead wire 15a extends from the main body. In the liquid level detection device 1 according to the embodiment, the bent portion 19 is formed so that the step in the terminal 16 becomes almost the same as the distance h between the bottom of the capacitor 15 and the lead wire 15a. Therefore, it is possible to bond the lead wire 15a of the capacitor 15 placed in the second cavity 62 to the terminal 16 one step raised from the second cavity 62, remaining a straight line state, by resistance welding or soldering. This enables to omit a step of forming the lead 15a extended from the main body of the capacitor 15, and to reduce the manufacturing cost.

Two positioning parts 64 are formed on the top of the primary molded body 60 (the surface shown in FIG. 5 (a)) and the bottom (the surface shown in FIG. 5 (c)). When insertion molding the primary molded body 60 provided with the magnetic detection element 14 and the likes mounted (during secondary molding), a pin provided in a mold is inserted into the positioning part 64, thereby positioning and fixing the primary molded body 60. Four positioning parts 64 formed in the primary molded body 60 have similar configurations, thus one positioning part 64 will be described here.

Figure 7:
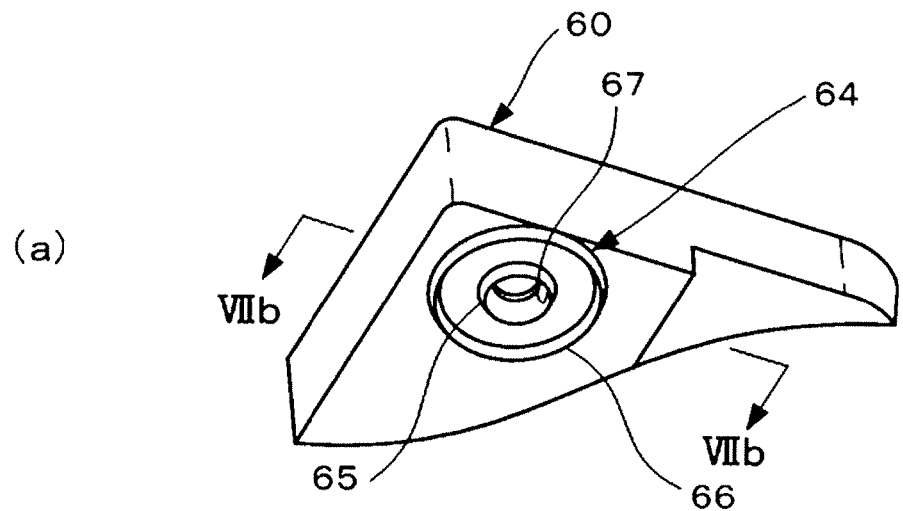
FIG. 7 shows the details of a positioning part formed in a liquid level detection device according to an embodiment of the invention.
Figure 7:
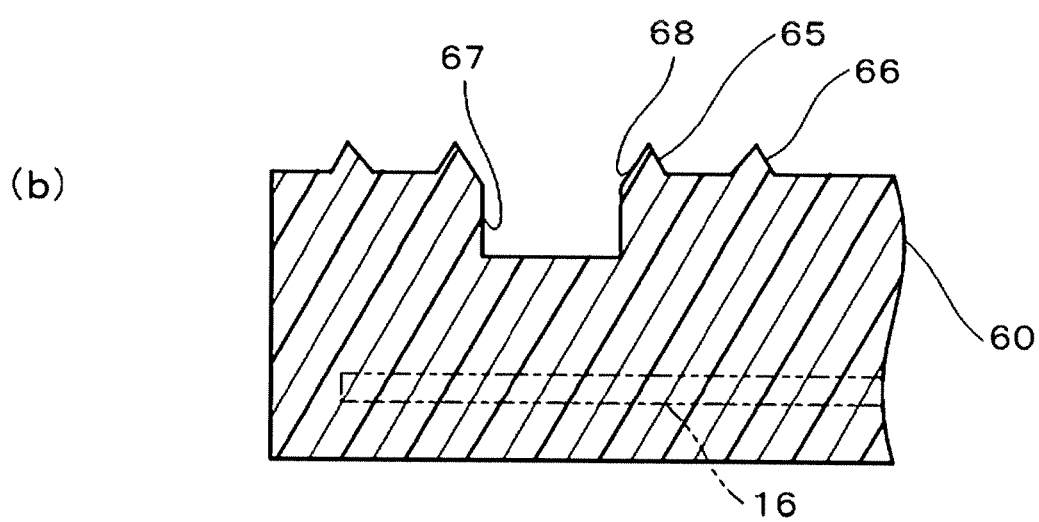
Figure 8:
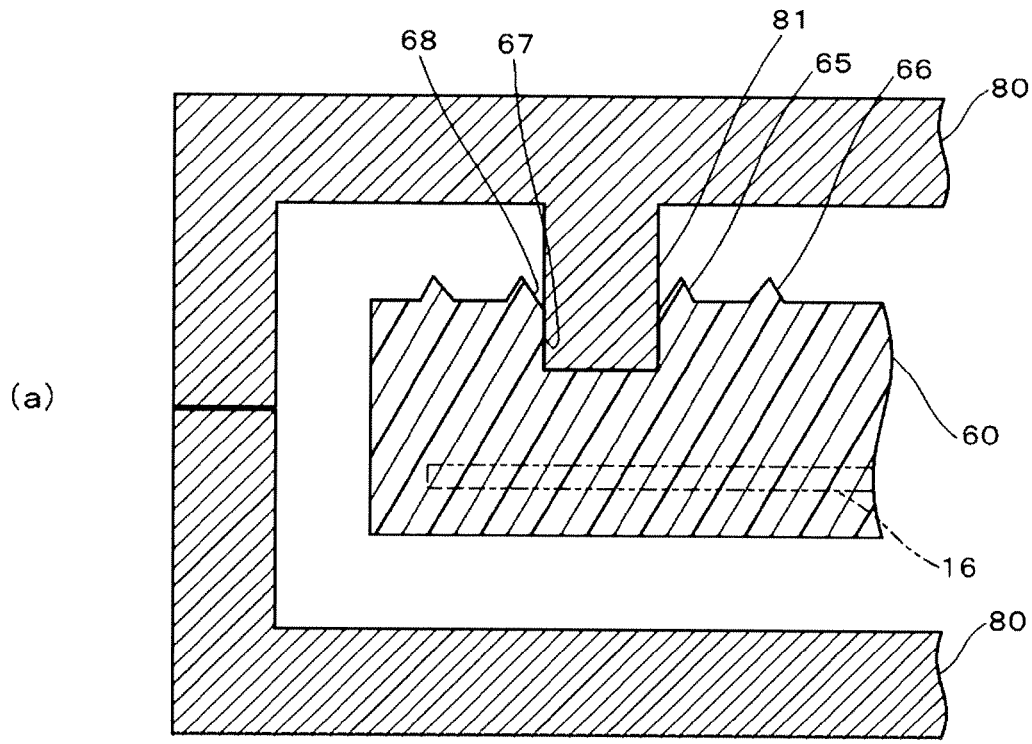
FIGS. 8 (a) and (b) are sectional views showing steps of secondary molding of a main body unit constituting a liquid level detection device according to an embodiment of the invention.
Figure 8:
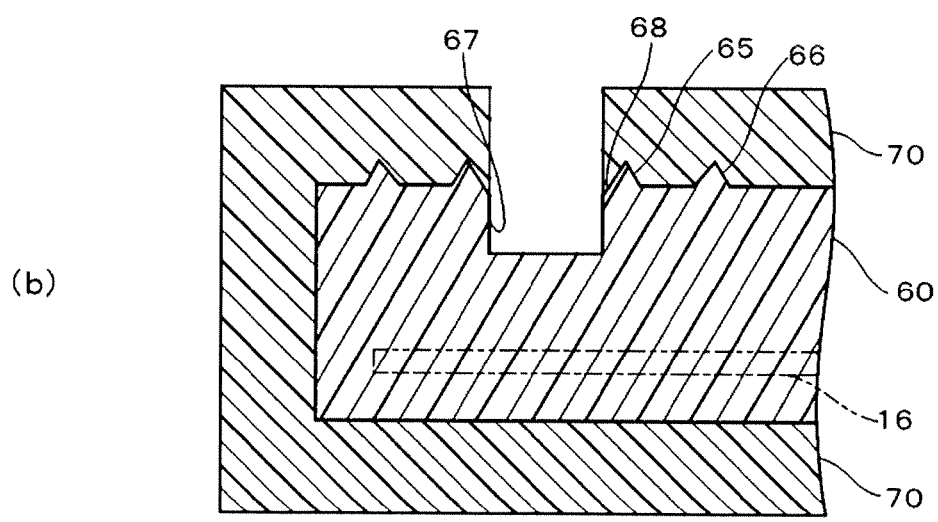

FIG. 7 shows the details of the positioning part 64 formed in the liquid level detection device 1 according to the embodiment. FIG. 7 (*a*) is a magnified view of the part Vila in FIG. 5 (*c*). FIG. 7 (*b*) is a sectional view of the positioning part 64 taken along the arrow Vllb-Vllb in FIG. 7 (*a*). FIGS. 8 (*a*) and (*b*) are sectional views showing steps of secondary molding of the main body unit that constitutes the liquid level detection device according to the embodiment of the invention.

As shown in FIGS. 7 (*a*) and (*b*), the positioning part 64 has a second protrusion ring 66 that is a protrusion extending like a ring having a triangular cross section, a first protrusion ring 65 that is a protrusion formed inside the second protrusion ring 66, extending like a ring having a triangular cross section, and a pin hole 67 that is formed inside the first protrusion ring 65, and fits with a positioning pin 81 (FIG. 8 (*b*)) provided in a mold 80 (FIG. 8 (*a*)) to be described in the secondary molding.

As shown in FIG. 7 (*b*), the inside slope of the first protrusion ring 65 does not have a flat portion, and forms an inducing portion that is directly connected to the peripheral edge of the pin hole 67. Thus, as shown in FIG. 8 (*a*), even if the positioning pin 81 provided in the mold 80 is displaced from the position of the pin hole 67 in the primary molded body 60, the inducing portion 68 can lead the positioning pin 81 into the pin hole 67. Therefore, it is possible to maintain a proper positional relationship between the primary molded body 60 and the mold 80.

As shown in FIGS. (a) and (b), first the positioning pin 81 provided in the mold is inserted into the pin hole 67, and the primary molded body 60 is positioned and fixed. Then, the resin for the secondary molded body 70 is injected into the mold 80, and the secondary molded body 70 is formed around the primary molded body 60.

As described above, the first protrusion ring 65 and second protrusion ring 66 have triangular cross sections with a pointed apexes. Thus, the apexes of the first and second protrusion rings 65 and 66 are easily melted by the molding heat of secondary molding. Therefore, it is possible to securely execute the welding of the primary molded body 60 and the secondary molded body 70. This securely prevents the liquid to be measured from entering into the main body unit 10, and prevents corrosion of the mounted electronic components or the like.

In this way, the primary molded body 60 provided with the magnetic detection element 14 and the likes is formed by insertion molding, and the main body unit 10 shown in FIG. 5 (*b*) is molded. As described above, on the top of the molded main body unit 10, the welding protrusion 12 is formed so as to surround the rotary support part 11.

Figure 9:
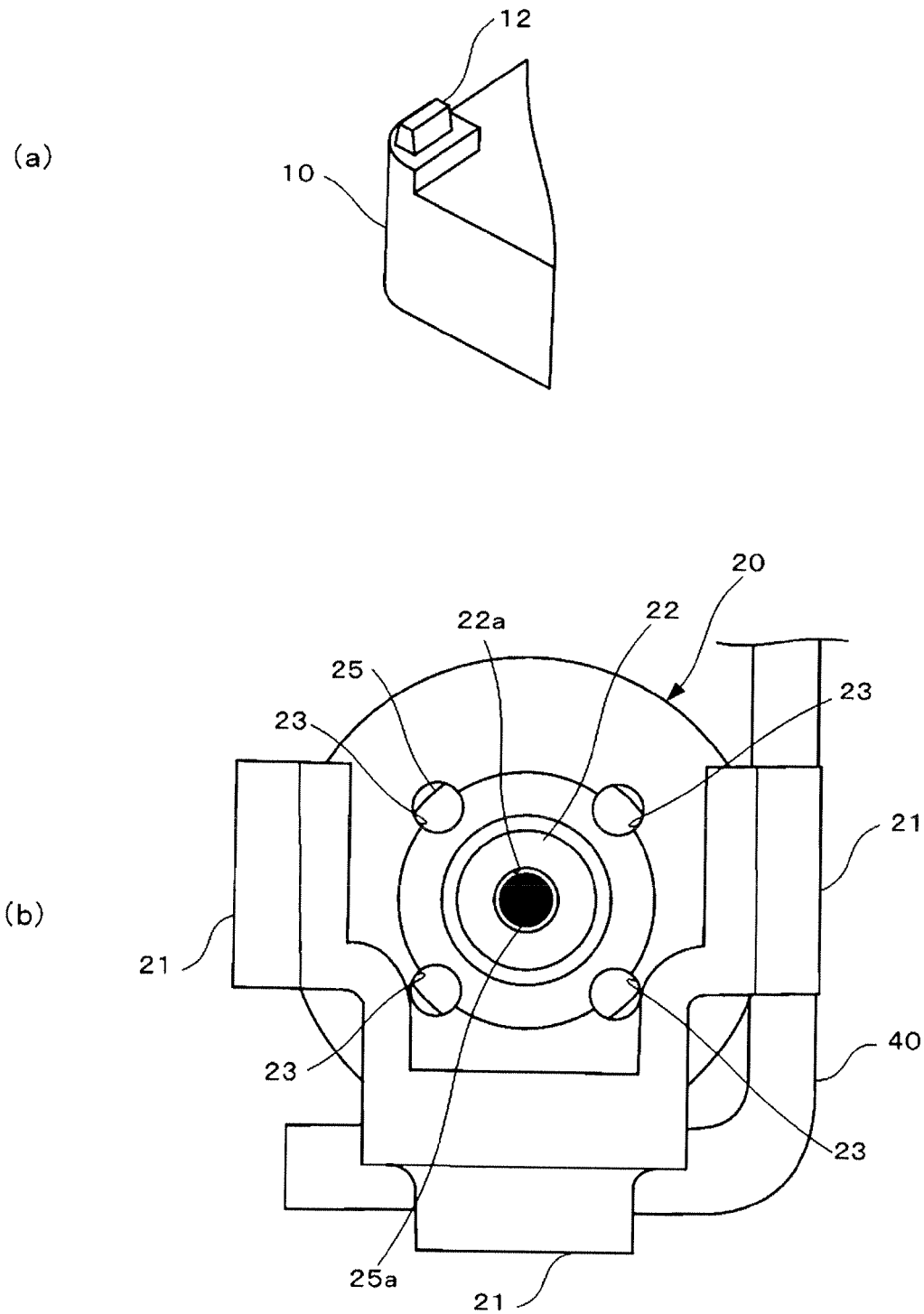
FIG. 9 (a) is a view showing a welding protrusion, and is a magnified view of the part "IXb" in FIG. 5 (b).

FIG. 9 (*a*) is a view showing the welding protrusion 12, and is a magnified view of the part IXb in FIG. 5 (*b*). As shown in the drawing, the cross section of the welding protrusion 12 is trapezoidal and tapered upward. The welding part 31 of the cover 30 (FIG. 1) is pressed to the welding protrusion 12, and the welding protrusion 12 is melted by a laser (not shown). The welding protrusion 12 is tapered, and the distal end portion is easily melted by a laser. This makes it possible to ensure a sufficient dissolving amount during welding, and ensure a sufficient welding strength between the main body unit 10 and the cover 30.

The dissolving amount of the welding protrusion 12 for welding the cover 30 to the main body unit 10 is desirably a half or more of the height of the trapezoid. The dissolving amount of the welding protrusion 12 can be checked by measuring the amount of gap between the cover 30 and the main body unit 10. As described above, as a cross section of a part to be melted is formed as a tapered trapezoidal protrusion, it is possible to easily ensure the proper welding strength between the cover 30 and the main body unit 10. It is also possible to easily check whether the welding is properly executed.

Next, the holder 20 and the magnet 25 formed in the holder 20 by insertion molding will be explained. FIG. 9 (*b*) is a view showing the holder 20, and is a plan view of the holder 20 taken along the arrow IXb-IXb in FIG. 1.

As described above, the holder 20 is provided with a middle hole 22*a* that communicates to the magnet 25 so as to enable to visually recognize the magnet 25 from outside. The central axes of the rotary shaft 22 (middle hole 22*a*) and the magnet 25 are aligned. Therefore, the magnet 25 is formed by insertion molding, so that when the magnet 25 is viewed through the middle hole 22*a*, the center of the magnet 25 coincides with the center of the middle hole 22*a*. As shown in FIG. 9 (*b*), in the embodiment, a circular mark 25*a* is displayed at the center of the magnet 25. The diameter of the mark 25*a* is smaller than that of the middle hole 22*a*. The mark 25*a* may be represented by a circular protrusion, a cavity, or a printed mark. In FIG. 9 (*b*), the mark 25*a* is represented by a circle painted in black inside to facilitate understanding of the drawing.

As described above, since mark 25*a* indicated in the center of the magnet 25 can be viewed from outside through the middle hole 22*a*, when the mark 25*a* is present at the center of the middle hole 22*a*, it is possible to determine that the magnet 25 has been placed in an appropriate position in the holder 20. On the other hand, when the mark 25*a* is not present at the center of the middle hole 22*a*, it is possible to determine that the magnet 25 has been displaced, and the amount of displacement can also be checked. Therefore, it is possible to detect the displacement of the magnet 25 in an early stage, thereby improving the yield in the manufacturing process.

In the holder 20 in the embodiment, four magnet check holes 23 are formed separately from the middle hole 22*a* to enable detection of the displacement of the magnet 25 in an early stage. As shown in FIG. 9 (*b*), the magnet check hole 23 is provided in the holder 20 at an equal distance and equal angular interval from the center of the rotary shaft 22. The magnet check hole 23 is a hole that communicates to the magnet 25 so as to enable a visually check of the magnet 25 from the outside of the holder 20. Thus, when the magnet 25 is accurately placed in the holder 20, the outline of the magnet 25 is visually recognized in the same way from the magnet check hole 23. On the other hand, when the appearance of the magnet 25 from the four magnet check holes 23 is different, the magnet 25 is judged displaced. In this way, by checking the magnet 25 through the four magnet check holes 23 formed in the holder 20, it is possible to detect the displacement of the magnet 25 in an early stage, and improve the yield in the manufacturing process.

The invention is not limited to the above embodiment, and may be modified and improved in various forms. In the embodiment, the main body unit 10 is provided with a protruded rotary support part 11, the holder 20 is provided with a rotation hole 24 to fit with the rotary support part 11.

The main body unit 10 may be provided with a hole for rotation, and the holder 20 may be provided with a protrusion to fit in the hole. Similarly, the relationship between the holder 20 and the cover 30 is not limited to the embodiment.

In the embodiment, the terminal 16 comprises a first flat portion 16a, and a second portion 16b that is stepped down from the first portion 16a by the bent portion 19. The bending dimension of the bent portion 19 is determined by the distance between the lead wire 15a and the bottom of the capacitor 15. As shown in FIG. 4, in the embodiment, the first flat portion 16a of the terminal 16 is provided with a relay terminal 85 that electrically routes the lead wire 15a of the capacitor 15 and the lead portion of the magnetic detection element 14. However, without providing the relay terminal 85, the lead wire 15a of the capacitor 15 and the lead portion of the magnetic detection element 14 may be connected to the other first portion 16a. In other words, for realizing a desired circuit, the lead wire 15a of the capacitor 15 and the lead portion of the magnetic detection element 14 may be electrically connected to any part in the first portion 16a of the terminal 16. The shape of the terminal 16 (particularly, the first portion 16a) may also be changed.

In FIG. 1, the liquid level detection device 1 is provided with the welding protrusion 12 formed in the main body unit 10. The tapered welding protrusion 12 may be formed on the bottom of the welding part 31 of the cover 30. In FIG. 7, the positioning part 64 is provided with the pin hole 67 formed at the center thereof. Not a pin hole, for example, a protrusion for positioning may be provided.

Further, in the embodiment, an adhesive is used for bonding the capacitor 15 and the terminal 16 (the second portion 16b). A double-side tape, for example, may be used for bonding the both. The term "adhesive" used here includes an adhesive, a double-sided tape and the likes.

As shown in FIG. 7, the primary molded body 60 is provided with a double protrusion (first and second protrusion rings 65 and 66) surrounding the pin hole 67. This is effective from the viewpoint of ensuring the welding strength between the primary molded body 60 and the secondary molded body 70, even when the outside second protrusion ring 66 is omitted, and only the inside first protrusion ring 65 is formed in the primary molded body 60.

The cross section of the first protrusion ring 65 and second protrusion ring 66 are not limited to a triangular shape, and may be any shape as long as the apex is tapered. Therefore, it is possible to easily melt the apex in the molding heat, and achieve secure welding of primary molded body 60 and the secondary molded body 70.

Further, as shown in FIG. 9 (b), the holder 20 is provided with the middle hole 22a and the magnet check hole 23 communicating to the magnet 25. However, both holes may not be formed in the holder 20. Even when only one hole is formed, it is possible to detect the displacement of the magnet 25.

The mark 25a at the center of the magnet 25 is a circle in the embodiment. However, the mark 25a may be of any shape as long as the center position of the magnet 25 can be visually recognized. For example, the mark 25a may be a cross marked at the center of the magnet 25.

Further, as shown in FIG. 7 (b), the inducing portion 68 in the first protrusion ring 65 forms a slope with a certain angle to the pin hole 67. However, the slope angle may be changed as long as the positioning pin 81 can be induced into the pin hole 67.

INDUSTRIAL APPLICABILITY

The embodiment of the invention is applied to a liquid level detection device that fixes components with a preferable strength, and a method of manufacturing the liquid level detection device.

DESCRIPTION OF REFERENCE NUMERALS

1 Liquid level detection device
10 Main body unit
11 Rotary support part
12 Welding protrusion
14 Magnetic detection element
15 Capacitor
15a Lead wire
16 Terminal
16a First portion
16b Second portion
19 Bent portion
20 Holder
22 Rotary shaft
22a Middle hole
23 Magnet check hole
24 Rotation hole
25 Magnet
25a Mark
30 Cover
31 Welding part
33 Bearing unit
40 Float arm
50 Float
60 Primary molded body
62 Second cavity
64 Positioning part
65 First protrusion ring
66 Second protrusion ring
67 Pin hole
68 Inducing portion
70 Secondary molded body
80 Mold
81 Positioning pin

The invention claimed is:
1. A liquid level detection device comprising:
a holder that has a magnet inside, and rotates in accordance with displacement of a float floating on liquid that is a measuring object of liquid level; and
a main body unit that comprises a magnetic detection element for detecting a change in a magnetic pole accompanying rotation of the magnet, a capacitor, and a terminal that is electrically connected to the magnetic detection element and the capacitor,
wherein the main body unit comprises a primary molded body that is formed by insertion molding the terminal, and a secondary molded body that is formed by insertion molding the primary molded body provided with the capacitor and the magnetic detection element,
the primary molded body comprises a positioning means for positioning the primary molded body at a predetermined position when molding the secondary molded body, and a first protrusion ring that is a circular protrusion surrounding the positioning means, and
an apex of the first protrusion ring is welded to a part that is molded when molding the secondary molded body, wherein the positioning means is a in hole, into which a positioning in is inserted, and an inside slope of the first protrusion ring is directly connected to the peripheral edge of the in hole.

2. The liquid level detection device according to claim 1, wherein the primary molded body further comprises a second protrusion ring surrounding the first protrusion ring.

3. The liquid level detection device according to claim 1, wherein the first protrusion ring has a triangular cross section.

4. A method of manufacturing a liquid level detection device comprising:
- a holder that has a magnet inside, and rotates in accordance with displacement of a float floating on liquid that is a measuring object of liquid level; and
- a main body unit comprising a magnetic detection element for detecting a change in a magnetic pole accompanying rotation of the magnet, a capacitor, and a terminal that is electrically connected to the magnetic detection element and the capacitor, the method comprising:
- a step of molding a primary molded body by insertion molding the terminal, and
- a step of molding the main body unit by insertion molding the primary molded body provided with the capacitor and the magnetic detection element, wherein the primary molded body comprises a positioning means for positioning the primary molded body at a predetermined position when molding the main body unit, and a protrusion ring that is a circular protrusion surrounding the positioning means, and wherein the positioning means is a in hole, into which a positioning in is inserted during the step of molding the main body unit, and an inside slope of the first protrusion ring is directly connected to the peripheral edge of the pin hole.

* * * * *